US012451629B2

(12) United States Patent
Chen

(10) Patent No.: US 12,451,629 B2
(45) Date of Patent: Oct. 21, 2025

(54) ELECTRICAL CONNECTOR HAVING AN INSULATIVE HOUSING AND A BOTTOM SUBSTRATE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: De-Jin Chen, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 392 days.

(21) Appl. No.: 17/743,613

(22) Filed: May 13, 2022

(65) Prior Publication Data

US 2022/0376414 A1 Nov. 24, 2022

(30) Foreign Application Priority Data

May 18, 2021 (CN) ......................... 202110539933.8

(51) Int. Cl.

| | |
|---|---|
| ***H01R 12/71*** | (2011.01) |
| ***H01R 12/57*** | (2011.01) |
| ***H01R 12/70*** | (2011.01) |
| ***H01R 13/506*** | (2006.01) |
| ***H01R 13/627*** | (2006.01) |
| ***H01R 13/631*** | (2006.01) |
| ***H01R 24/62*** | (2011.01) |

(52) U.S. Cl.
CPC ........... *H01R 12/716* (2013.01); *H01R 12/57* (2013.01); *H01R 12/7064* (2013.01); *H01R 13/6272* (2013.01); *H01R 13/631* (2013.01); *H01R 24/62* (2013.01); *H01R 13/506* (2013.01)

(58) Field of Classification Search
CPC .... H01R 12/716; H01R 12/57; H01R 12/732; H01R 12/7064; H01R 13/6272; H01R 13/631; H01R 13/506; H01R 24/62
USPC .......................................................... 439/626
See application file for complete search history.

(56) References Cited

U.S. PATENT DOCUMENTS

| | | | | |
|---|---|---|---|---|
| 5,219,292 | A | 6/1993 | Dickirson et al. | |
| 5,709,573 | A * | 1/1998 | McClure .............. | H01R 12/716 439/857 |
| 6,634,893 | B1 | 10/2003 | Korsunsky et al. | |
| 7,210,942 | B2 | 5/2007 | Uchida et | |
| 7,232,315 | B2 | 6/2007 | Uchida et al. | |

(Continued)

FOREIGN PATENT DOCUMENTS

| | | | |
|---|---|---|---|
| CN | 201413880 | Y | 2/2010 |
| CN | 202373758 | U | 8/2012 |
| CN | 211829411 | U | 10/2020 |

*Primary Examiner* — Christopher M Koehler
*Assistant Examiner* — Gregory L Mangot
(74) *Attorney, Agent, or Firm* — Ming Chieh Chang

(57) ABSTRACT

An electrical connector includes: an insulative housing having a top wall and a pair of side walls; and a substrate secured to the insulative housing to constitute a bottom wall of the insulative housing, the substrate having plural front conductive pads at an upper face thereof and plural rear conductive pads at a lower face thereof in electrical connection with the plural front conductive pads.

6 Claims, 14 Drawing Sheets

(56) References Cited

U.S. PATENT DOCUMENTS

| | | | | |
|---|---|---|---|---|
| 7,238,044 | B2 | 7/2007 | Uchida et al. | |
| 7,261,569 | B2 | 8/2007 | Uchida et al. | |
| 8,941,013 | B2 | 1/2015 | Arnold | |
| 9,318,820 | B2 | 4/2016 | Niitsu et al. | |
| 10,601,181 | B2 | 3/2020 | Lu et al. | |
| 2011/0151708 | A1* | 6/2011 | Kaneko | H01R 12/714 439/660 |
| 2012/0212920 | A1* | 8/2012 | Schreffler | H01R 12/737 29/830 |
| 2014/0017940 | A1 | 1/2014 | Chen et al. | |
| 2020/0203867 | A1* | 6/2020 | Lu | H01R 12/716 |
| 2021/0345506 | A1* | 11/2021 | Tsuji | H01R 12/7047 |
| 2022/0021155 | A1 | 1/2022 | Chen et al. | |

* cited by examiner

ELECTRICAL CONNECTOR HAVING AN INSULATIVE HOUSING AND A BOTTOM SUBSTRATE

BACKGROUND OF THE INVENTION

1. Field of the Invention

The present invention relates to an electrical connector comprising:

- an insulative housing and a substrate secured to the insulative housing to constitute a part of the insulative housing, wherein the substrate has a plurality of front and rear conductive contacts.

2. Description of Related Arts

China Patent Nos. 202373758 and 201413880 each disclose an electrical connector utilizing a printed circuit board or substrate to simply perform functions of conductive contacts while overall structure of the electrical connector remains largely unchanged.

U.S. Pat. No. 8,941,013 discloses a receptacle connector including a pre-impregnated layer sandwiched between a first layer and a second layer. In one embodiment, the first layer can be a printed circuit board (PCB) copper clad layers and contacts can be disposed on the first layer and configured to align with and mate to corresponding spring fingers on a mating plug connector. A cavity can be formed between the first layer and the second layer, thereby forming a receiving area for the plug connector.

SUMMARY OF THE INVENTION

An electrical connector comprises: an insulative housing having a top wall and a pair of side walls; and a substrate secured to the insulative housing to constitute a bottom wall of the insulative housing, the substrate having a plurality of front conductive pads at an upper face thereof and a plurality of rear conductive pads at a lower face thereof in electrical connection with the plurality of front conductive pads.

DETAILED DESCRIPTION OF THE PREFERRED EMBODIMENT

Figure 1:
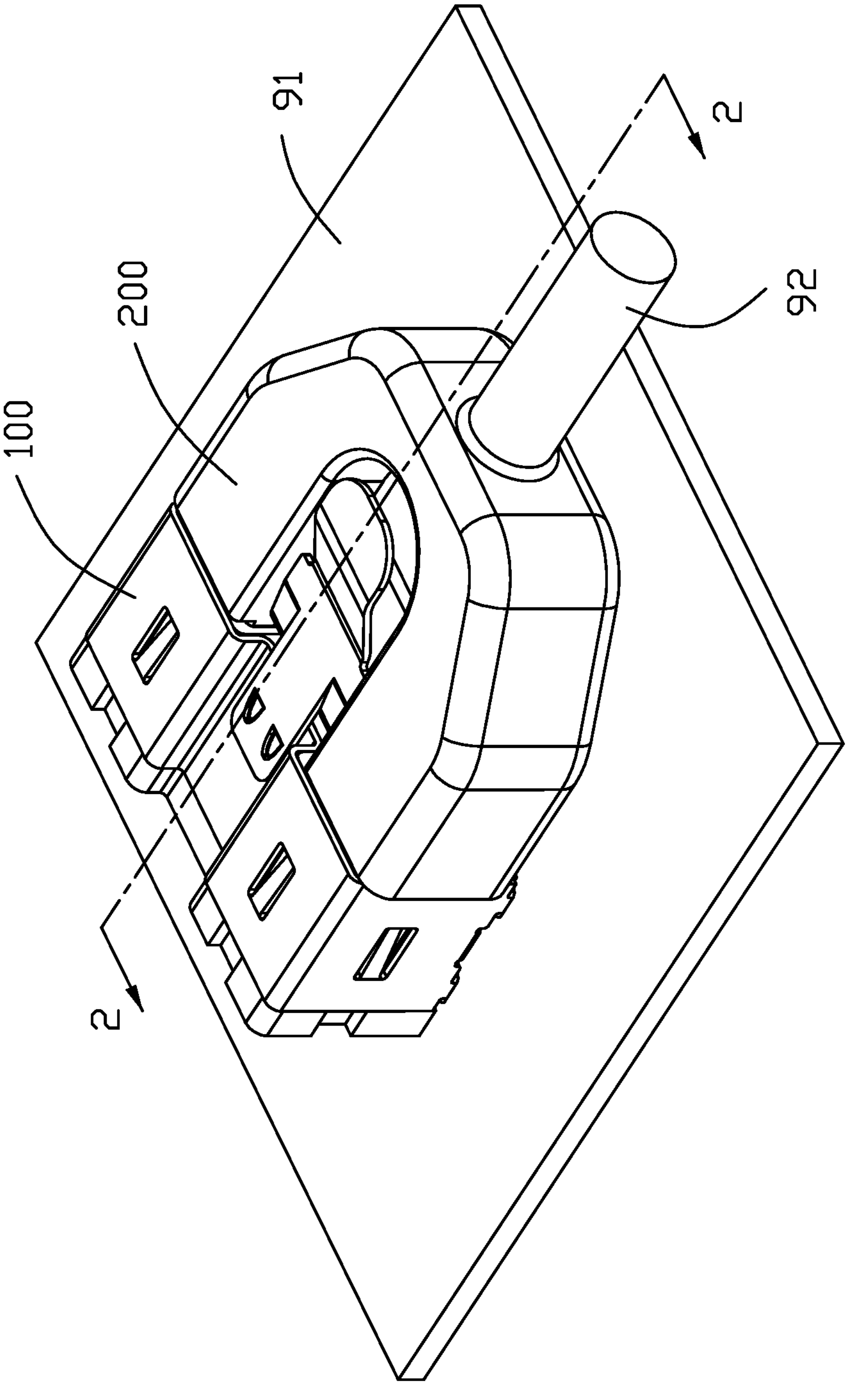
FIG. 1 is a perspective view of an electrical connector assembly in accordance with the present invention mounted on a printed circuit board (PCB)
Figure 2:
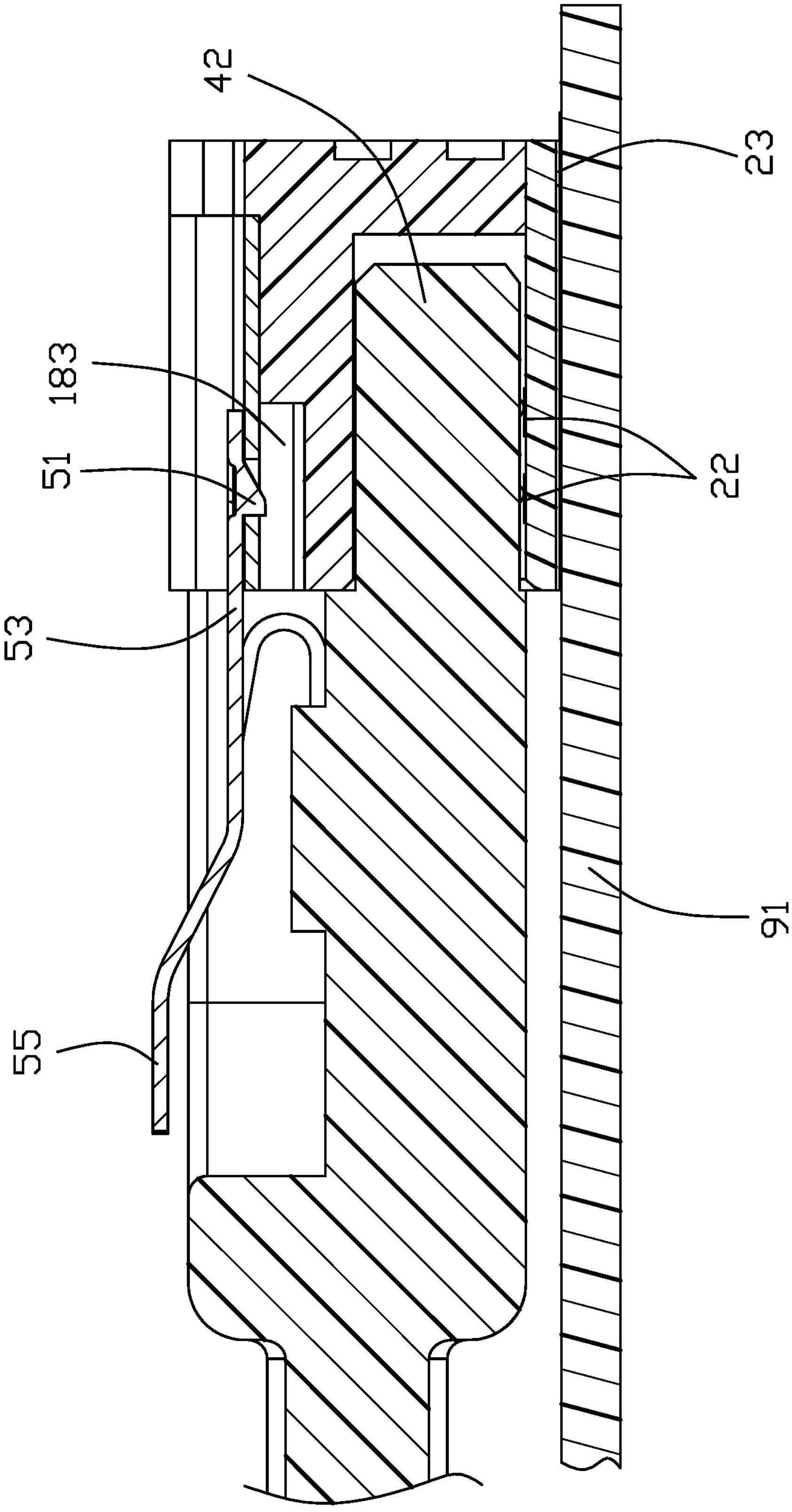
FIG. 2 is a cross-sectional view of the electrical connector assembly taken along line A-A in FIG. 1.
Figure 3:
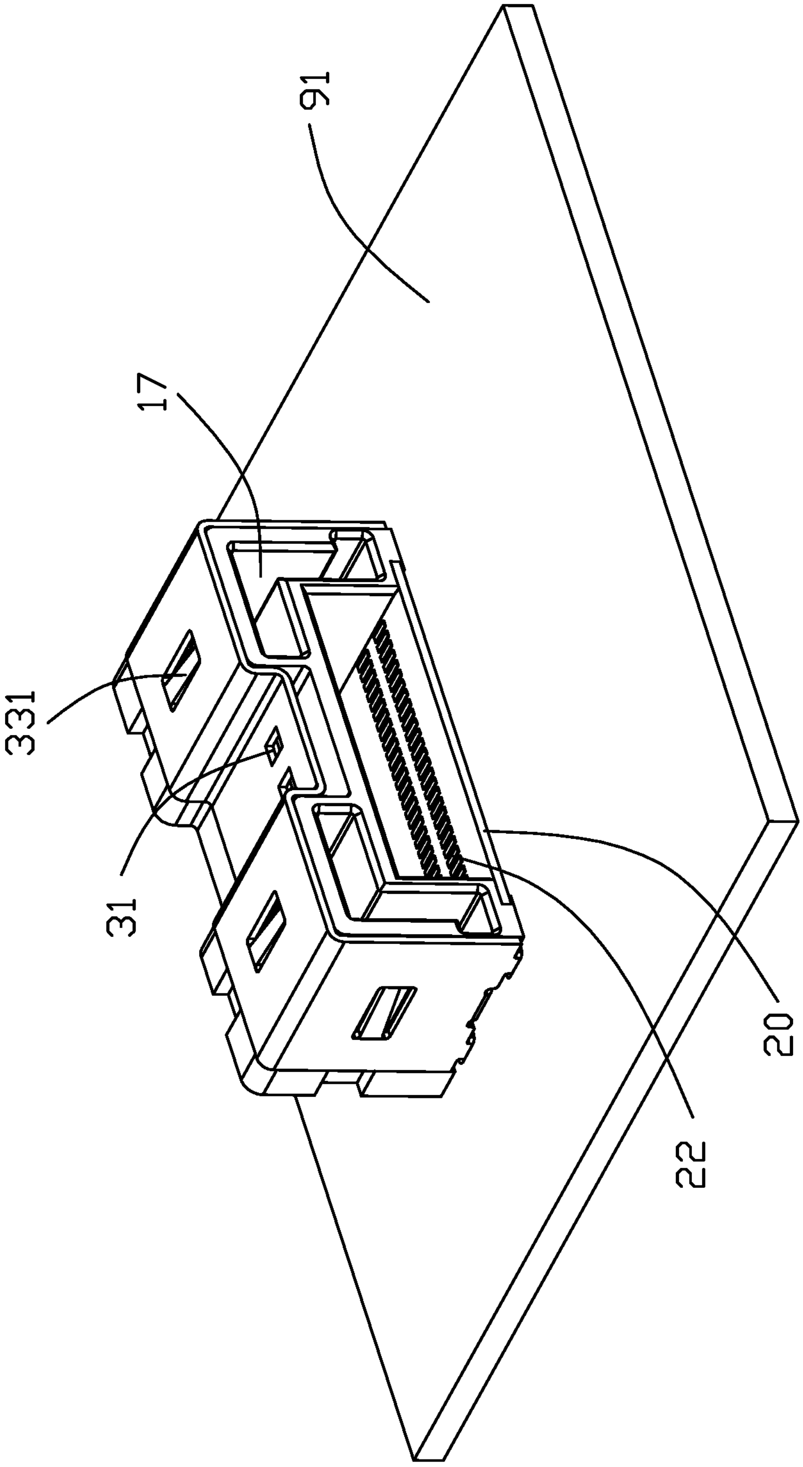
FIG. 3 is a perspective view of a receptacle connector of the electrical connector assembly mounted on the PCB.
Figure 4:
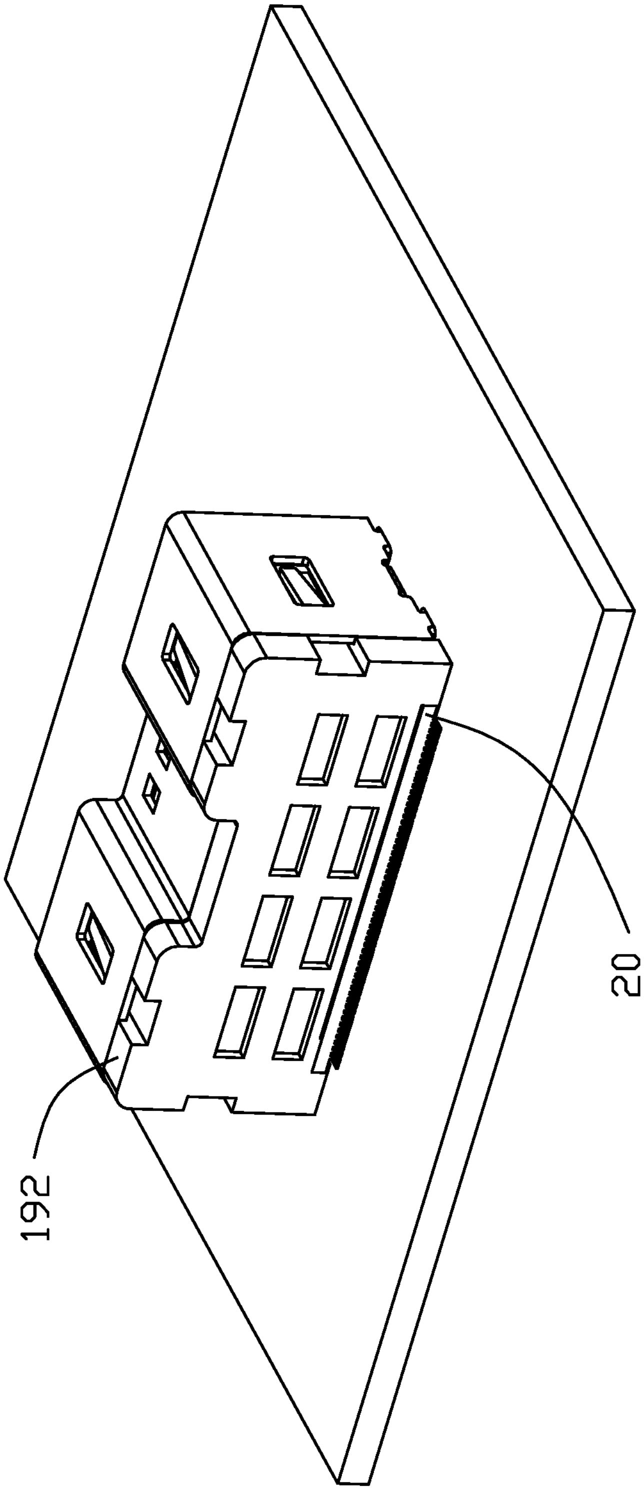
FIG. 4 is a view similar to FIG. 3 but from a different perspective.
Figure 5:
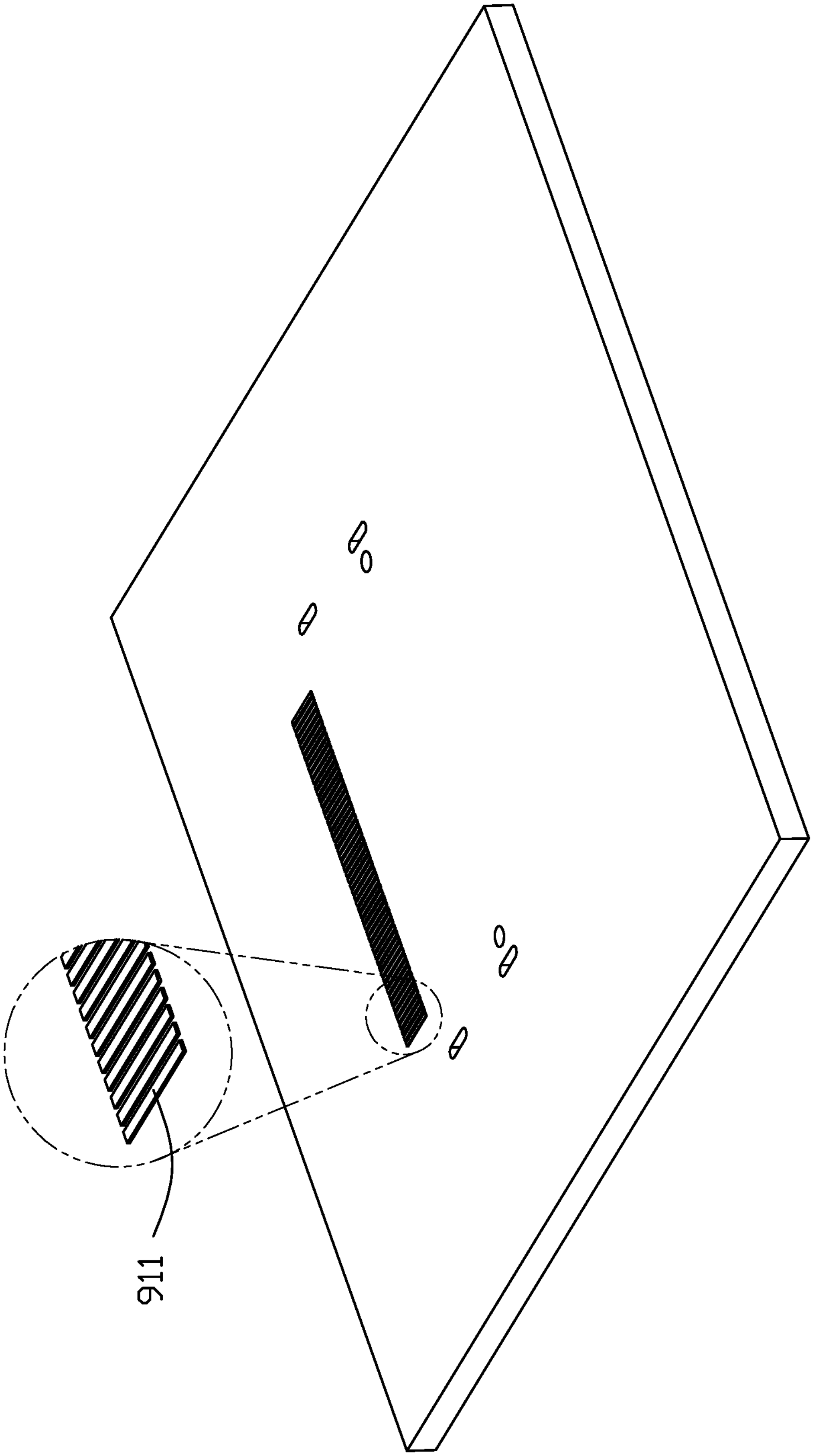
FIG. 5 is a perspective view of the PCB.
Figure 6:
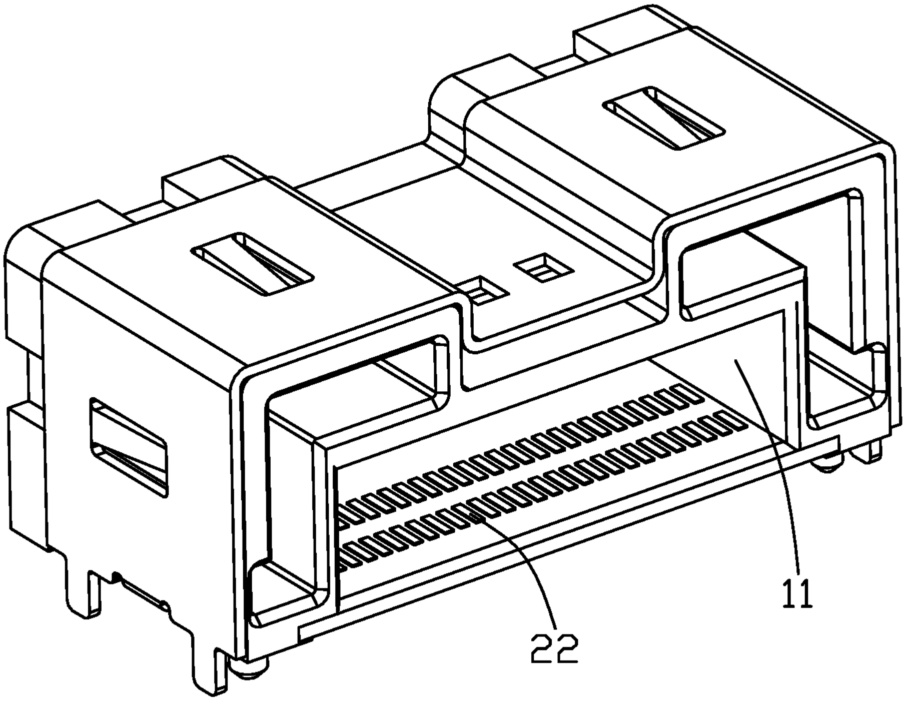
FIG. 6 is a perspective view of the receptacle connector alone.
Figure 7:
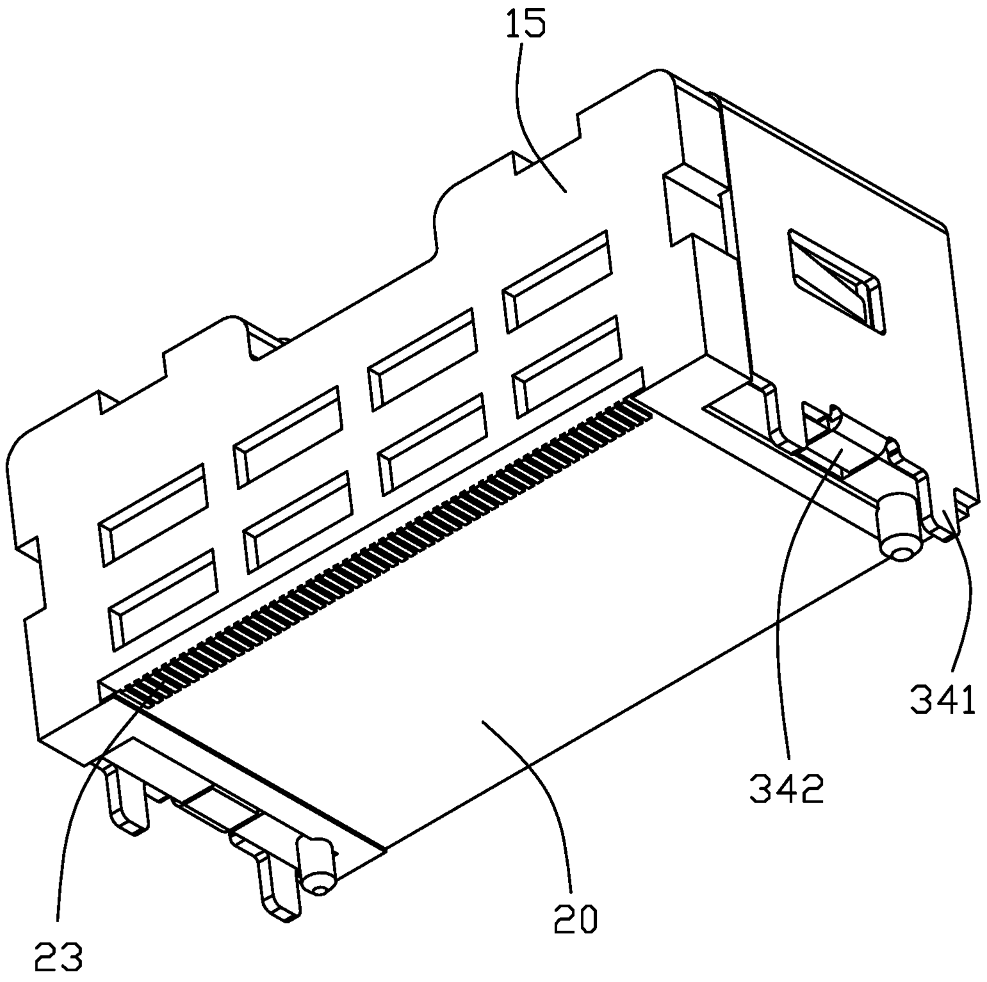
FIG. 7 is a view similar to FIG. 6 but from a different perspective.
Figure 8:
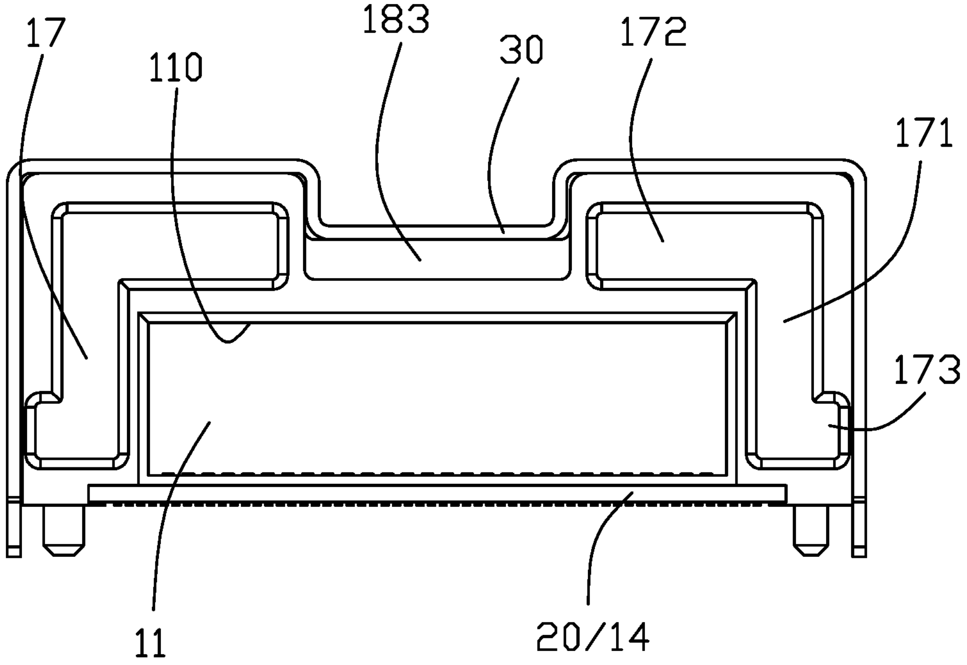
FIG. 8 is a front view of the receptacle connector.
Figure 9:
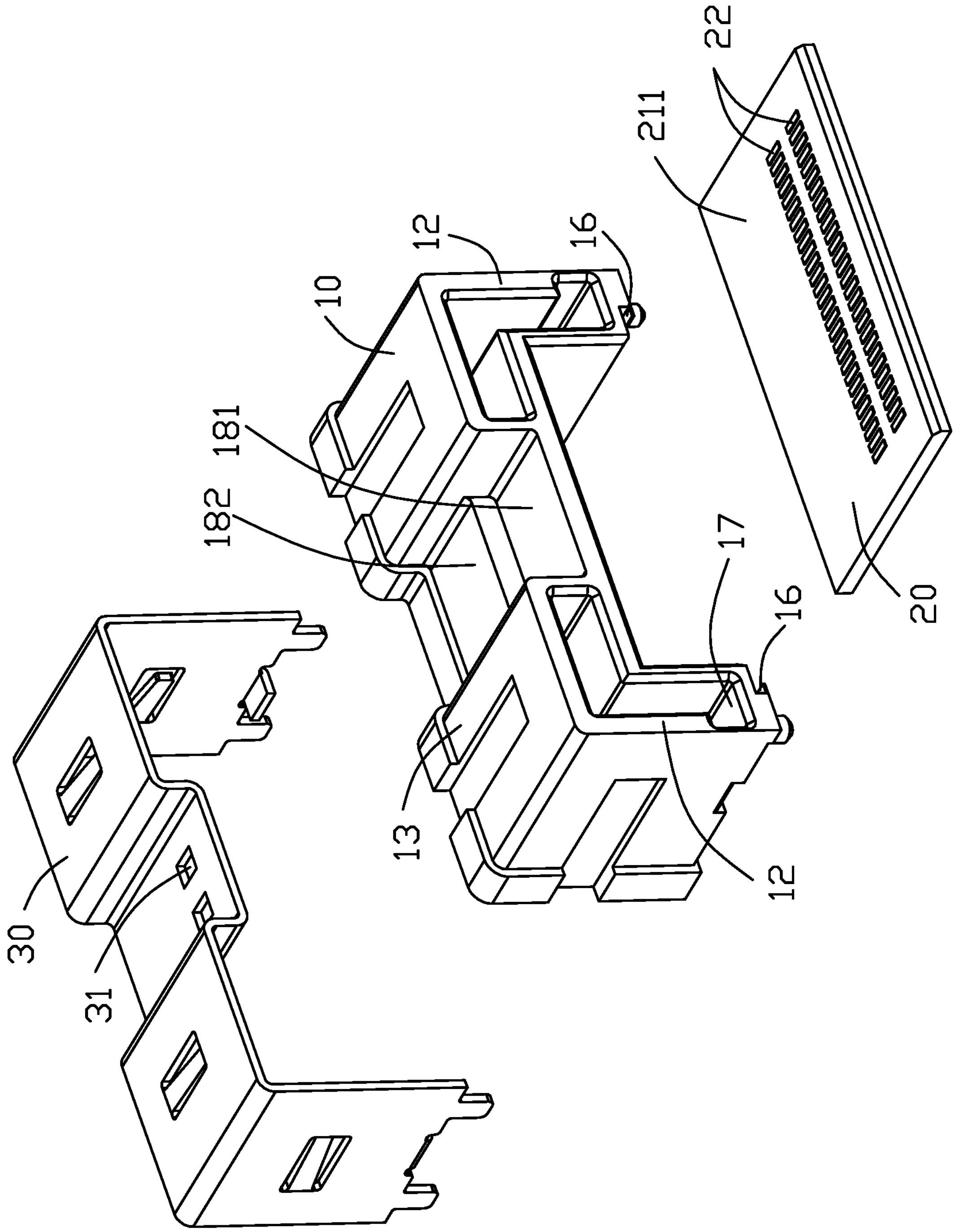
FIG. 9 is an exploded view of the receptacle connector.
Figure 10:
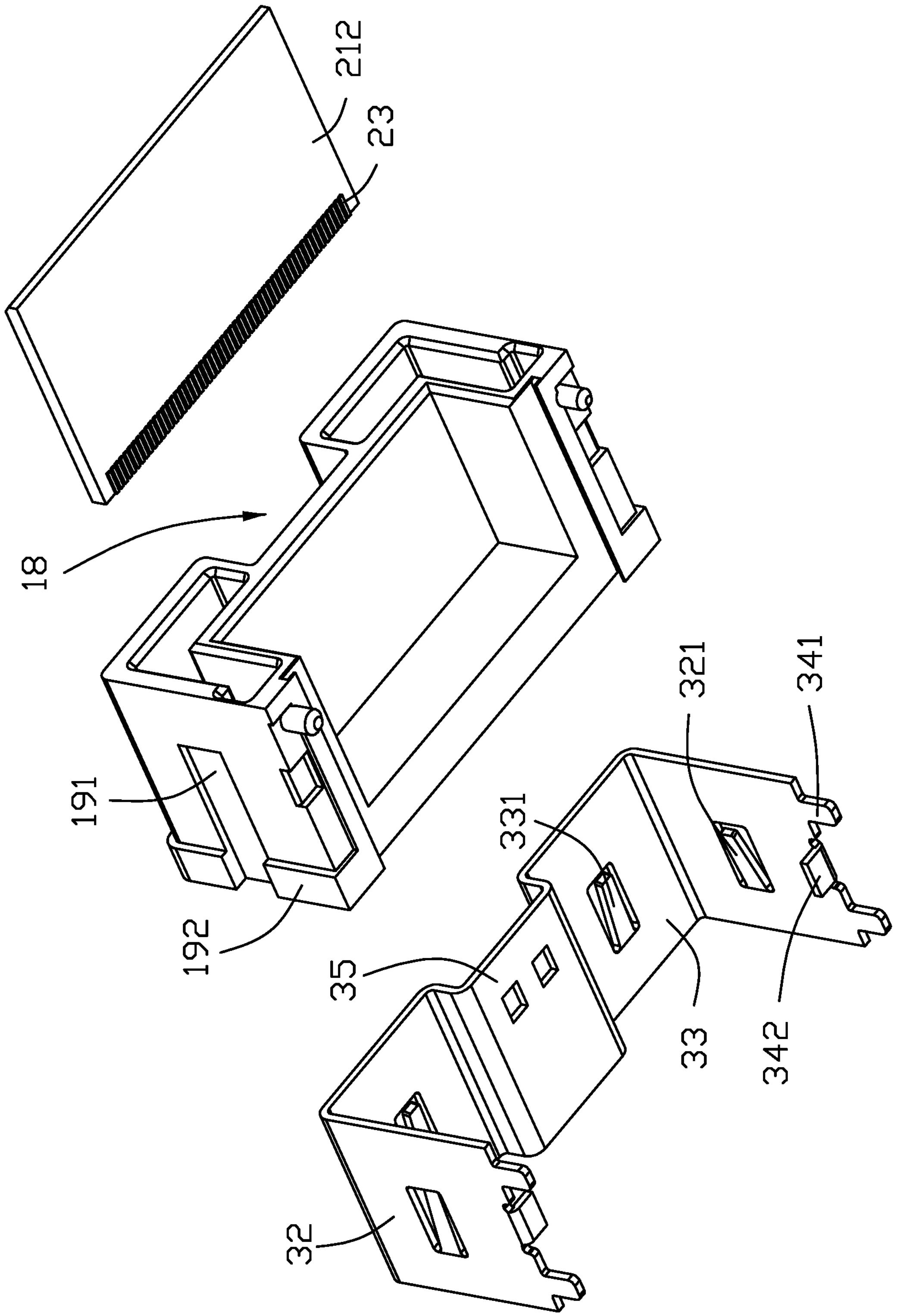
FIG. 10 is a view similar to FIG. 9 but from a different perspective.
Figure 11:
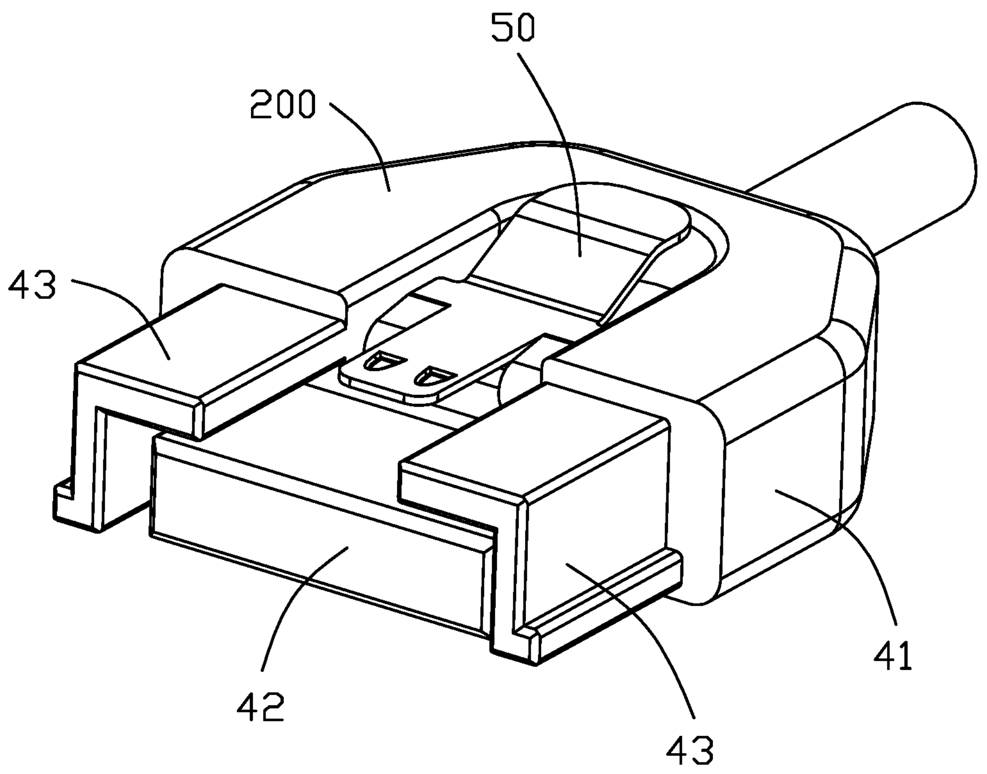
FIG. 11 is a perspective view of a plug connector of the electrical connector assembly.
Figure 12:
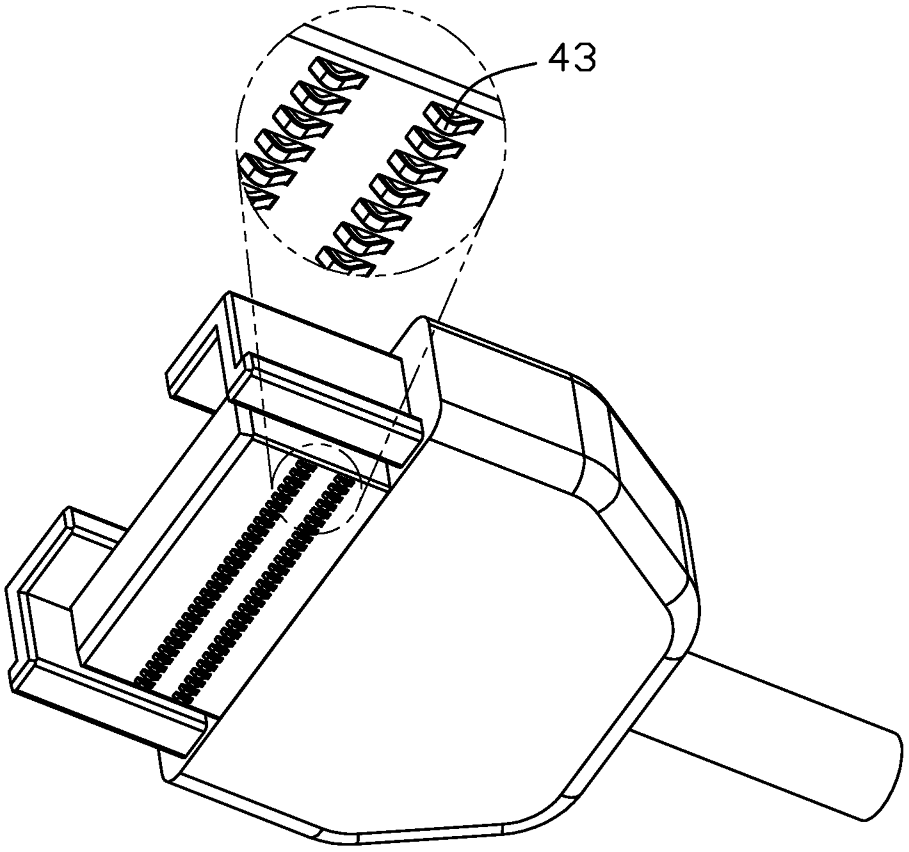
FIG. 12 is a view similar to FIG. 11 but from a different perspective.
Figure 13:
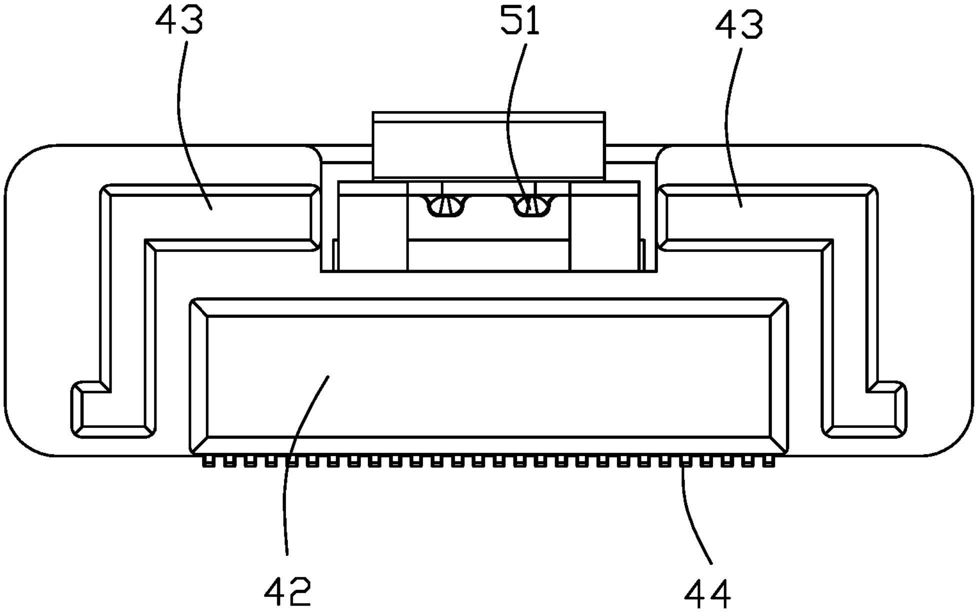
FIG. 13 is a front view of the plug connector.
Figure 14:
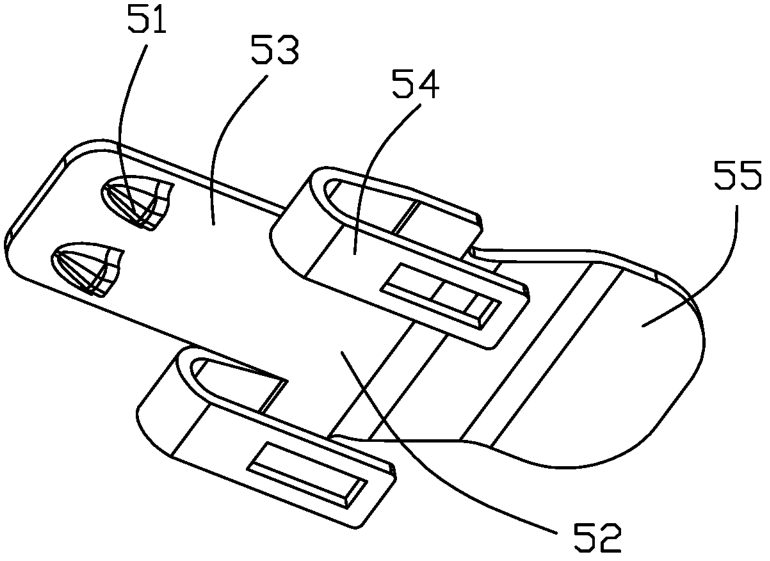
FIG. 14 is a perspective view of a latch of the plug connector.

Referring to FIGS. 1 to 14, an electrical connector assembly comprises a board-mounted receptacle connector 100 and a cable-end plug connector 200. The receptacle connector 100 to be mounted on a printed circuit board (PCB) 91 forgoes use of a traditional stamped contact structure; instead, a substrate 20 with conductive pads and suitable wirings is utilized to meet low-profile and high-speed demands.

The receptacle connector 100 includes an insulative housing 10 having a top wall 13 and a pair of side walls 12 and the substrate 20 secured to the insulative housing 10 and having a plurality of front conductive pads 22 at an upper face 211 thereof and a plurality of rear conductive pads 23 at a lower face 212 thereof in electrical connection with each other through suitable circuitry or wirings (not shown) generally known in this art to electrically connect the plurality of front and rear conductive pads. A mating chamber 11 is enclosed by the insulative housing 10 and the substrate 20. The front conductive pads 22 are exposed to the chamber 11 and the rear conductive pads 23 are to be soldered to conductive pads 911 on the PCB 91. In this embodiment, the front conductive pads 22 are arranged in two rows while the rear conductive pads 23 are arranged in one row.

Each of the pair of side walls 12 has a mounting groove 16. The substrate 20 is interference fit with the grooves 16 to constitute a bottom wall 14 of the insulative housing 10. In a front view the mating chamber 11 is rectangular. The insulative housing 10 further has a rear wall 15.

A pair of grooves 17 are disposed on the insulative housing 10. The receptacle connector 100 may further include a metallic cover 30 secured to the insulative housing 10 and having a latching feature, such as a hole 31. Each of the pair of grooves 17 has a first part 172 at the top wall 13 and a second part 171 at a corresponding side wall 12. The second part 171 of the groove 17 may have a horizontal extension 173. The top wall 13 of the insulative housing 10 has a recessed portion 18, at an outer face thereof between the two mounting grooves 16, to provide a space between the latching feature 31 of the metallic cover 30 and the top wall 13 of the insulative housing 10. The recessed portion 18 may have a first wall face 181 and a second wall face 182. The metallic cover 30 may have a bent portion 35 bearing against the second wall face 182 while defining a latching space 183 together with the first wall face 181. The pair of grooves 17 and the latching space 183 assist in blind-mate and contribute to a stable structure after mating.

The metallic cover 30 has a top plate 33 and a pair of side plates 32 each with one or more fingers 321 or 331; the insulative housing 10 has a pair of recesses 191 and a protrusion 192. Each side plate 32 has a pair of first legs 341 and a second leg 342. The bent portion 35 is formed on the top plate 33 and the latching feature 31 is formed at the bent portion 35.

The plug connector 200 is connected to a cable 92 and includes a base 41, a mating portion 42 and a pair of adapting portions 43 both extending forward beyond a front face of the base 41, and a latch 50 mounted to the base 41. The mating portion 42 has a plurality of contacts 44 at a lower face thereof. When the plug connector 200 is mated to the receptacle connector 100, the mating portion 42 is inserted into the mating chamber 11, the plurality of contacts 44 mate with the plurality of front conductive pads 22, and the pair of adapting portions 43 are inserted into the pair of grooves 17. The adapting portion 43 is shaped to match the groove 17 of the insulative housing 10. The latch 50 has a latching feature, e.g., a pair of protrusions 51, for engaging the latching holes 31. The pair of adapting portions 43 are provided around three sides of the mating portion 42. The latch 50 is situated between the pair of adapting portions 43. The latch 50 has a body 52, an arm 53, a pair of securing portions 54, and a pressing portion 55. The latching protrusions 51 are formed on the arm 53.

What is claimed is:

1. A connector device comprising a printed circuit board and a receptacle electrical connector mounted on the printed circuit board, the receptacle electrical connector comprising:

an insulative housing having a top wall and a pair of side walls; and a substrate secured to the insulative housing to constitute a bottom wall of the insulative housing, the substrate having a plurality of front conductive pads at an upper face thereof and a plurality of rear conductive pads at a lower face thereof in electrical connection with the plurality of front conductive pads, wherein the insulative housing and the substrate define a mating chamber opening forwardly for receiving a mating plug connector.

2. The connector device as claimed in claim 1, wherein a pair of grooves are disposed on the insulative housing.

3. The connector device as claimed in claim 2, wherein each of the pair of grooves has a first part at the top wall and a second part at a corresponding one of the pair of side walls.

4. The connector device as claimed in claim 3, wherein the second part of the groove has a horizontal extension.

5. The connector device as claimed in claim 1, further comprising a metallic cover secured to the insulative housing and having a latching feature.

6. The connector device as claimed in claim 5, wherein the top wall of the insulative housing has a recessed portion to provide a space between the latching feature of the metallic cover and the top wall of the insulative housing.

* * * * *